United States Patent [19]

Mishra

[11] 4,086,499

[45] Apr. 25, 1978

[54] STABLE ELECTRETS OF STYRENE-TYPE POLYMERS

[75] Inventor: Anupama Mishra, Guelph, Canada

[73] Assignee: Uniroyal Ltd., Canada

[21] Appl. No.: 745,256

[22] Filed: Nov. 26, 1976

[51] Int. Cl.$^2$ .............................................. H01B 3/44
[52] U.S. Cl. .............................. 307/88 ET; 252/63.2; 361/233
[58] Field of Search ................................ 252/63.2, 63; 307/88 ET; 156/272; 55/DIG. 39; 131/262 B; 361/233; 179/111 E

[56] References Cited

U.S. PATENT DOCUMENTS 3,755,043  8/1973  Igarashi et al. ...................... 156/272

OTHER PUBLICATIONS

ACS Monograph "Styrene Its Polymers etc.", Boundy et al., pp. 546–548, 553–557.

*Primary Examiner*—Harris A. Pitlick
*Attorney, Agent, or Firm*—James J. Long

[57] ABSTRACT

An electret made of styrene-type polymer (e.g., polystyrene), having a volume resistivity of at least $10^{16}$ ohm-cm and a glass transition temperature above 50° C, and containing not more than 1% by weight of electron-donor impurities and not more than 0.5% by weight of electron-acceptor impurities, said electret being capable of retaining at least 75% of its charge after exposure to a temperature of 50° C and a relative humidity of 100% for 100 days.

9 Claims, No Drawings

STABLE ELECTRETS OF STYRENE-TYPE POLYMERS

This invention relates to an electret made of styrene-type polymer.

An electret may be defined as a permanently polarized dielectric material. In more detail it may be described as a dielectric material that has been subjected to a sufficiently intense electrostatic field to produce a residual internal polarization that persists after the field is removed. An electret may be regarded as an electrostatic analog of a permanent magnet.

It has previously been known to make electrets from various polymers including polystyrene (see, for example, U.S. Pat. Nos. 3,755,043, Igarashi et al., Aug. 28, 1973; 3,793,715, Murayama et al., Feb. 26, 1974; 3,821,491, Whetstone et al., June 28, 1974; and 3,702,493, Murphy, Nov. 14, 1972). Unfortunately, known electrets consisting of polystyrene have not been stable under ambient conditions, especially under high humidity.

In accordance with the present invention it has now been found, unexpectedly, that a stable electret can be made from a styrene-type polymer selected from the group consisting of homopolymers of styrene, vinyltoluene or t-butylstyrene, and copolymers of said monomers, said polymer having a volume resistivity of at least $10^{16}$ ohm-cm, and a glass transition temperature above 50° C, and containing not more than 1% by weight of electron-donor impurities and not more than 0.5% by weight of electron-acceptor impurities. The novel electret of the invention is characterized by the ability to retain at least 75% of its original charge after exposure to a temperature of 50° C and a relative humidity of 100% for 100 days.

A styrene-type polymer suitable for use in the invention may be prepared by polymerization (in which term we include copolymerization) of at least one of the monomers styrene, vinyltoluene, or t-butylstyrene by conventional methods, preferably by emulsion polymerization with a free radical initiator as described by Sorenson et al. "Preparative Methods of Polymer Chemistry", Interscience, New York, 1968, p. 220. For purposes of the invention, the polymer is purified by dissolving it in a high purity solvent such as benzene (reagent grade) or chloroform, filtering, and precipitating with a non-solvent (e.g., methanol) followed by drying. This purification treatment may be repeated more than once if desired. The treatment yields a polymer that is substantially free from impurities which we have observed to be highly detrimental to the stability of electrets made from such styrene-type polymers. Thus, we have found that impurities with electron-acceptor properties cause rapid charge decay in an electret made from the styrene-type polymer; impurities with electron-donor properties have less effect. We have found that polystyrene electrets are more sensitive to such impurities than poly(vinyltoluene) electrets, which are in turn more sensitive than poly(t-butylstyrene) electrets. As a result of our work, we consider such impurities as residual monomers, alpha-methyl styrene, aromatic solvents, anthracene, and especially polarizable groups such as iodine, bromine, etc., as well as tetracyanoethylene, tributyl phosphate, and the like, to be deleterious to the stability of the electrets made from styrene-type polymer. The styrene-type polymers employed in the present invention to produce stable electrets accordingly contain not more than 1% by weight of electron-donor impurities, and not more than 0.5% by weight of electron-acceptor impurities. The electrets made from such styrene-type polymers surprisingly are capable of retaining 75% or more of their initial charge after being aged in an atmosphere of 100% relative humidity at a temperature of 50° C for 100 days. Under such aging conditions, previously known polystyrene electrets would retain only 10% or less of their original charge.

The styrene-type polymer is ordinarily provided in the form of a film or sheet (e.g., 1 to 1000 mil thickness) for conversion into an electret. The electret may be formed by any known conventional method for charging or polarizing electrets. Thus, the electret may be charged by injection of charged particles (injected space-charge formation). This involves applying high voltage across the sheet to create an ionized plasma (at room temperature or at any elevated temperature below the softening temperature of the polymer) whereby a charge is injected under the influence of the electrical field, and subsequently (after cooling to room temperature if elevated temperature has been used) removing the field, whereby a space-charge homoelectret consisting of the herein-described styrene-type polymer is formed. It will be understood that the term "homoelectret" refers to an electret in which the surface facing the positive electrode develops a positive charge and the surface facing the negative electrode develops a negative charge. (In a dipole-oriented heteroelectret or in an internal space-charge heteroelectret the opposite is true.)

Polystyrene for use in the invention may be prepared using the following emulsion polymerization recipe:

| Ingredients | Parts by Weight |
| --- | --- |
| Water | 100 |
| Potassium persulfate | 0.05 |
| Sodium hydrogen phosphate | 0.05 |
| Sodium laurylsulfate | 1.00 |
| Styrene | 50 |

The polymerization may be effected by agitating the aqueous emulsion in a closed reaction vessel under nitrogen at a temperature of 70° C for 2 hours, and then at 95° C for 2 hours. The polystyrene latex, so produced, is precipitated by adding alum solution and boiling the resulting mixture. Polystyrene is separated by filtration, washed and dried in an oven at 60° C in vacuum. This polystyrene has an intrinsic viscosity of 2.2 deciliters per gram, measured in toluene at 30° C.

The resulting polystyrene typically has the following average properties: specific gravity of 1.07, a tensile strength of 9,000 psi, an elongation of 1.8% at break, a flexural strength of 11,000 psi, a volume resistivity of $10^{16}$ ohm-cm and a glass transition temperature (Tg) of 100° C. At this stage of preparation this polystyrene cannot be made into an electret having satisfactory stability (ability to hold a charge over a long period of time under various atmospheric conditions). Instead, for purposes of the invention and in order to obtain a stable electret, the polystyrene has to be specially purified as herein described to remove impurities, particularly electron-accepting impurities. In the same way poly(vinyltoluene), poly(t-butylstyrene) and copolymers of two or more monomers selected from styrene, vinyltoluene or t-butylstyrene may be prepared for use as styrene-type polymers for making electrets in accordance with the invention. Films or sheets for making electrets may be formed from the described styrene polymers by any suitable conventional method, such as compression molding.

To make an electret, the styrene-type polymer film may be cut into a 5.7 by 5.7 cm square and mounted on a glass plate 5 mm thick. The glass plate is placed on a grounded metal plate (polystyrene film facing up). Another glass plate 5 mm thick is placed on the polystyrene film; this second glass plate has a coating of evaporated aluminum on the top which is connected to the negative terminal of a DC power supply. A charging voltage of 30 KV is applied for 1 minute at room temperature. After being thus charged the electret is wrapped with an aluminum foil to remove excess charge. The stable practical charge remaining may then be measured and evaluated by well-known techniques based on the fact that the charges in the electret produce an electrical field external to itself, which may be characterized by the expressions "equivalent surface charge" or "apparent surface charge density". The measurement methods used work mostly on the principle of induction, though other methods such as torsion balance and related force meters can also be applied to find the force between the electret and an electrode.

The apparent surface charge density of the electret may be measured [see Reedyk et al, J. Electrochem. Soc. 115, 49 (1968)] by placing the electret between a fixed electrode and an electrode rotating in the surface field of the electret (a chopper electrode) to produce an AC signal. A bias voltage is then applied across the rotating and fixed electrodes sufficient to produce a zero output signal. The apparent surface charge density in coulombs per square centimeter is equal to $$KEV/d$$

where $K$ is the dielectric constant of the electret material (2.5 for polystyrene), $E$ is the permittivity of the free space (8.854 × $10^{-14}$ faraday/cm), $V$ is the externally applied bias voltage for null signal, and $d$ is the thickness of the film in cm. For a particular electret, K, E and d are constant, making the apparent surface charge density directly proportional to the null bias voltage, V.

The stability of the electret may be evaluated by determining the apparent surface charge density of the electret (or, simply, the null bias voltage which is proportional thereto as just described) repeatedly over a period of time, in electrets that have been subjected to various environmental conditions over the period of the tests. In this way the ability of the electret to retain a charge over a long period of time, at room temperature and at elevated temperature, and under conditions of low and high humidity, can be determined, as illustrated in the examples below.

It has surprisingly been found that the present electrets made from specially purified styrene-type polymers are stable over wide variations of temperature and humidity. The electrets of the invention show stabilities very similar to the well known polyfluorolefin electrets and in addition the present electrets consisting in their entirety of the described polymers have the advantages of lower cost, ease of fabrication and useful mechanical properties, particularly rigidity, making the present electrets more versatile than those currently used.

The electrets require no lamination to another polymer and find applications in electro-acoustic devices such as microphones, headphones and speakers and in dust particle control, high voltage electrostatic generators, electrostatic recorders and other applications.

The following Examples will serve to illustrate the practice of the invention in more detail.

EXAMPLE 1

Polystyrene is prepared according to the emulsion polymerization recipe and procedure given above. The dried polystyrene crumb obtained from the polymerization process is purified carefully as follows: The polystyrene is dissolved in reagent grade benzene to make a 5% (by weight) solution which is then filtered under pressure. The polystyrene is then precipitated from the benzene solution by slow addition of the solution to vigorously stirred methanol. The precipitated polystyrene particles are dried in a vacuum oven at 100° C for 5 hours and then pressed into films, about 15 mils thick, in a laboratory press at a temperature of 150° C and a pressure of 1000 psi.

A number of sample electrets are prepared from the polystyrene film as described above. Initial apparent surface charge density (expressed as null bias voltage) is determined on the electrets as described above and then samples are exposed to various atmospheric conditions as indicated in Table 1 for periods of time ranging up to 300 days, the bias voltage measurements being repeated at intervals as shown in Table I to determine the charge decay characteristics of the polystyrene electrets under various conditions. The results tabulated in Table I represent the average of five samples. The results show the remarkable stabilities of the polystyrene electrets of the invention, even under humid conditions and at elevated temperature. In contrast, an electret made from the same polystyrene without any purification treatment would lose 90% of its charge within a few days at 50° C and 100% relative humidity; the same would be true of electrets made from commercial grade polystyrene without any purification.

Table 1

| | Charge Decay Characteristics of Polystyrene* Electrets | | | | | |
|---|---|---|---|---|---|---|
| | Room Temperature Dry | | Room Temperature 100% Relative Humidity | | 50° C/100% Relative Humidity | |
| Time In Days | Bias Voltage | Relative Ratio | Bias Voltage | Relative Ratio | Bias Voltage | Relative Ratio |
| 0 | 1380 | 1.00 | 1400 | 1.00 | 1360 | 1.00 |
| 3 | 1350 | 0.98 | 1360 | 0.97 | 1290 | 0.95 |
| 10 | 1300 | 0.94 | 1330 | 0.95 | 1260 | 0.93 |
| 24 | 1370 | 0.99 | 1350 | 0.96 | 1230 | 0.90 |
| 48 | 1370 | 0.99 | 1260 | 0.90 | 1110 | 0.82 |
| 123 | 1310 | 0.95 | 1130 | 0.81 | 1080 | 0.80 |
| 300 | — | | 1000 | 0.71 | — | |

*Reagent grade benzene used in purification.

EXAMPLE 2

Example 1 is repeated except that commercial grade benzene is used as the solvent in purifying the polystyrene in place of reagent grade benzene. The charge decay characteristics are very much poorer, as shown in Table 2. Repeating the precipitation procedure with commercial grade benzene only increases the rate of charge decay, as shown in the right-hand half of Table 2. While it is not desired to limit the invention to any particular theory of operation, it is believed to be possible that the deleterious effect of using commercial grade benzene may be due to certain impurities in commercial grade benzene. Thus, commercial benzene stored in plastic-lined containers can contain a mixture of trioctyl added to the purified polystyrene to make a slurry. Most of the solvent is allowed to evaporate under room conditions and the rest is removed at 40°–50° C under vacuum for 6 hours. Films are prepared and converted into electrets as described previously. The charge decay characteristics of the electrets are then determined. Tables 3 and 3A show typical results then obtained (at 50° C, 100% relative humidity) using polystyrene containing various electron-donor additives (Table 3) and various electron-acceptor additives (Table 3A). It will be seen that additives with electron-acceptor properties (Table 3A) cause rapid charge decay in the electrets whereas those with electron-donor properties (Table 3) have less effect. The electrets of Tables 3 and 3A containing additives are outside the invention.

Table 3

| | Charge Decay Characteristics of Electrets of Polystyrene* Doped With Various Electron-Donor Additives | | | | | | | |
|---|---|---|---|---|---|---|---|---|
| Time in | No Additive | | 1% Anthracene | | 2% Alpha-methylstyrene | | 1% Trioctyl phosphite | |
| Days | BV | RR | BV | RR | BV | RR | BV | RR |
| 0 | 1400 | 1.00 | 1500 | 1.00 | 1600 | 1.00 | 1400 | 1.00 |
| 1 | 1300 | 0.93 | 1400 | 0.93 | 1500 | 0.94 | 1200 | 0.86 |
| 3 | 1260 | 0.90 | 1210 | 0.81 | 1360 | 0.85 | 1200 | 0.86 |
| 9 | 1230 | 0.88 | 1170 | 0.78 | 1220 | 0.76 | 1150 | 0.82 |
| 21 | 1120 | 0.80 | 980 | 0.65 | 1080 | 0.67 | 1110 | 0.80 |

*Commercial chloroform was used during purification.
BV = Bias Voltage
RR = Relative Ratio Table 3A

| | Charge Decay Characteristics of Electrets of Polystyrene* Doped With Various Electron-Acceptor Additives | | | | | | | |
|---|---|---|---|---|---|---|---|---|
| Time in | No Additive | | 1% Iodine | | 1% Tetracyanoethylene | | 1% Tributyl phosphate | |
| Days | BV | RR | BV | RR | BV | RR | BB | RR |
| 0 | 1400 | 1.00 | 1400 | 1.00 | 1400 | 1.00 | 1500 | 1.00 |
| 1 | 1300 | 0.93 | 380 | 0.27 | 1030 | 0.74 | 700 | 0.46 |
| 3 | 1260 | 0.90 | — | — | — | — | — | — |
| 4 | — | — | 100 | 0.07 | 650 | 0.46 | 560 | 0.37 |
| 9 | 1230 | 0.88 | — | — | — | — | — | — |
| 11 | — | — | 0 | 0.00 | 430 | 0.31 | 480 | 0.32 |

*Commercial chloroform was used during purification.
BV = Bias Voltage
RR = Relative Ratio phosphite and trioctylphosphate. We have found that such impurities have a deleterious effect. The electrets of Table 2 are, accordingly, outside the present invention.

Table 2

| | Charge Decay Characteristics of Polystyrene* Electrets | | | | | | | | |
|---|---|---|---|---|---|---|---|---|---|
| | Precipitated Once | | | | | Precipitated Three Times | | | |
| | 50° C/Dry | | 50° C/100% Relative Humidity | | | 50° C/Dry | | 50° C/100% Relative Humidity | |
| Time In Days | Bias Voltage | Relative Ratio | Bias Voltage | Relative Ratio | Time In Days | Bias Voltage | Relative Ratio | Bias Voltage | Relative Ratio |
| 0 | 1550 | 1.00 | 1660 | 1.00 | 0 | 1640 | 1.00 | 1650 | 1.00 |
| 2 | 1550 | 1.00 | 1140 | 0.70 | 1 | 1700 | 1.04 | 330 | 0.20 |
| 8 | 1510 | 0.98 | 890 | 0.54 | 8 | 1350 | 0.82 | 250 | 0.15 |
| 29 | 1410 | 0.91 | 740 | 0.45 | 19 | 1280 | 0.78 | 190 | 0.11 |
| 38 | 1390 | 0.90 | 730 | 0.44 | 33 | 1240 | 0.75 | — | — |
| 77 | 1310 | 0.85 | 680 | 0.41 | 47 | 1190 | 0.73 | — | — |

*Commercial grade benzene used in purification.

EXAMPLE 3

This example demonstrates the effect of various electron-donor and electron-acceptor impurities on the polystyrene electret. To demonstrate the effect, the impurity is added at 1 to 2% level to polystyrene that has previously been purified as described above using commercial chloroform as the solvent. The required amount of impurity is dissolved in a large volume of analytical grade solvent (methanol or acetone) and

EXAMPLE 4

In this example resinous, thermoplastic poly(vinyltoluene) homopolymer and resinous, thermoplastic poly(t-butylstyrene) homopolymer are employed. The polymers may be prepared according to the procedure previously described for making polystyrene. The poly(vinyltoluene) has an intrinsic viscosity of 2.81 deciliters per gram, measured in toluene at 30° C; the intrinsic viscosity of the poly(t-butylstyrene) is 1.10 dl/g.

Purification of the polymers was attempted using commercial grade benzene as in Example 2. In certain cases the polymer was precipitated three times from commercial grade benzene into methanol. Electrets were then prepared and charge decay characteristics were determined, as described previously, upon aging at 50° C and 100% relative humidity, with the results shown in Table 4. These electrets, made with polymers contaminated with impurities from the commercial grade benzene used in purification, are outside the invention.

When Table 4 is compared to Table 2, it is seen that the effect of introduction of impurities (both once precipitated) in poly(vinyltoluene) at similar levels has less effect on the stability of its electrets than it has on the polystyrene electrets. However, when compared to poly(t-butylstyrene) with respect to similar levels of impurity concentration (thrice precipitated), poly(vinyltoluene) behaves worse. While it is not desired to limit the invention to any particular theory of operation, it is believed to be possible that this may be due to the fact that a bulky substitutuent in the benzene ring could somehow protect the polymer from the effects of impurities, resulting in electrets with longer life.

Table 4
Charge Decay Characteristics of Poly(vinyltoluene) and Poly(t-butylstyrene) Tested Under 50° C/100% Relative Humidity

|  | Poly(vinyltoluene) | | | | Poly(t-butylstyrene) | |
|---|---|---|---|---|---|---|
|  | Precipitated Once | | Precipitated Three Times | | Precipitated Three Times | |
| Time In Days | Bias Voltage | Relative Ratio | Bias Voltage | Relative Ratio | Bias Voltage | Relative Ratio |
| 0 | 1600 | 1.00 | 1800 | 1.00 | 1700 | 1.00 |
| 1 | 1570 | 0.98 | 1060 | 0.59 | 1540 | 0.91 |
| 8 | 1450 | 0.91 | 880 | 0.49 | 1500 | 0.88 |
| 20 | 1350 | 0.84 | 790 | 0.44 | 1520 | 0.89 |
| 30 | 1300 | 0.81 | 730 | 0.41 | 1510 | 0.89 |
| 50 | 1230 | 0.77 | 690 | 0.38 | 1510 | 0.89 |

EXAMPLE 5

Polystyrene was purified once through the use of commercial benzene or commercial chloroform and the electrets prepared from the polymers were tested for stability under 50° C/100% relative humidity. Table 5 shows this comparison. This shows that commercial chloroform is a better solvent for the purification of these polymers, perhaps because it does not contain aromatic impurities. Charge decay which results when commercial benzene is used (producing electrets which are outside the invention) is perhaps due to the inclusion of aromatic compounds in the polymers that can interact with the polystyrene structure.

Table 5
Stability of Polystyrene Electrets Depending On The Solvent Utilized During Purification Step. Tested Under 50° C/100% Relative Humidity.

| Purified through the use of benzene | | | Purified through the use of chloroform | | |
|---|---|---|---|---|---|
| Time In Days | Bias Voltage | Relative Ratio | Time In Days | Bias Voltage | Relative Ratio |
| 0 | 1660 | 1.00 | 0 | 2000 | 1.00 |
| 2 | 1140 | 0.70 | 1 | 1960 | 0.98 |
| 8 | 890 | 0.54 | 8 | 1840 | 0.92 |
| 29 | 740 | 0.45 | 29 | 1740 | 0.87 |
| 54 | 700 | 0.42 | 54 | 1600 | 0.80 |

EXAMPLE 6

Binary copolymers of styrene, vinyltoluene and t-butylstyrene were prepared using the same procedure as described previously for preparation of polystyrene. The copolymers were resinous termoplastics having the following intrinsic viscosities as measured in toluene at 30° C: Poly(styrene-co-vinyltoluene), 2.13 dl/g; polystyrene-co-t-butylstyrene), 2.70 dl/g; poly(vinyltoluene-co-t-butylstyrene), 1.15 dl/g. Analysis with the help of nuclear magnetic resonance spectroscopy showed that the copolymers were composed of 1:1 ratio of monomers. When these copolymers were purified through the use of commercial grade benzene prior to electret formation, the resultant electrets were found to be less stable than those when commercial grade chloroform was used. Table 6 shows the stabilities of electrets of the invention made from the chloroform purified materials when tested under 50° C/100% relative humidity.

Table 6
Charge Decay Characteristics of Various Copolymers (1:1) When Tested Under 50° C/100% Relative Humidity.

|  | Poly(styrene-co-vinyltoluene) | | Poly(styrene-co-t-butylstyrene) | | Poly(vinyltoluene-co-t-butylstyrene) | |
|---|---|---|---|---|---|---|
| Time In Days | Bias Voltage | Relative Ratio | Bias Voltage | Relative Ratio | Bias Voltage | Relative Ratio |
| 0 | 1160 | 1.00 | 1140 | 1.00 | 1480 | 1.00 |
| 4 | 1100 | 0.95 | 1080 | 0.94 | 1450 | 0.98 |
| 10 | 1120 | 0.96 | 1000 | 0.88 | 1440 | 0.97 |
| 17 | 1090 | 0.94 | 990 | 0.87 | 1370 | 0.93 |
| 24 | 1080 | 0.93 | 960 | 0.84 | 1360 | 0.92 |
| 31 | 1070 | 0.92 | 940 | 0.82 | 1330 | 0.89 |
| 45 | 1080 | 0.93 | 920 | 0.81 | 1350 | 0.91 |
| 57 | 1060 | 0.91 | 920 | 0.81 | 1340 | 0.90 |
| 100 | 950 | 0.82 | 860 | 0.75 | 1200 | 0.80 |

EXAMPLE 7

Poly(vinyltoluene), poly(ethylstyrene) and poly-(n-butylstyrene) were prepared from their monomers as in Example 1 and they were purified and pressed into films. The stabilities of their electrets are shown in Table 7. This shows that higher Tg is essential for a material to form stable electrets at room temperature.

The electrets of Table 7 consisting of poly(vinyltoluene) are within the invention; those consisting of poly(ethylstyrene) and poly(n-butylstyrene) are outside the invention.

polymer is above 100° C and it does not contain polarizable groups like iodine.

Table 9

Charge Decay Characteristics of Poly(styrene-co-alpha-methylstyrene 2:3) Electrets Under Various Environmental Conditions.

| Time In Days | Room Temperature/ 75% Relative Humidity | | 50° C/ Dry | | 50° C/100% Relative Humidity | |
|---|---|---|---|---|---|---|
| | Bias Voltage | Relative Ratio | Bias Voltage | Relative Ratio | Bias Voltage | Relative Ratio |
| 0 | 1710 | 1.00 | 1730 | 1.00 | 1700 | 1.00 |
| 1 | 100 | 0.06 | 1500 | 0.87 | 100 | 0.06 |
| 2 | 30 | 0.02 | 920 | 0.53 | 30 | 0.02 |
| 8 | — | — | 500 | 0.23 | — | — |

Table 7

Charge Decay Characteristics of Electrets of Various Polystyrene Derivatives Differing in Their Glass Transition Temperatures (Tg), Tested Under 50° C/100% Relative Humidity

| Time In Days | Poly (vinyltoluene) Tg = 110° C | | Poly (ethylstyrene) Tg = 27° C | | Poly (n-butylstyrene) Tg = 6° C | |
|---|---|---|---|---|---|---|
| | Bias Voltage | Relative Ratio | Bias Voltage | Relative Ratio | Bias Voltage | Relative Ratio |
| 0 | 1560 | 1.00 | 1400 | 1.00 | 2000 | 1.00 |
| 2 | 1500 | 0.96 | 800 | 0.57 | 100 | 0.05 |
| 8 | 1450 | 0.93 | 190 | 0.14 | — | — |
| 15 | 1420 | 0.91 | 50 | 0.04 | — | — |

EXAMPLE 8

Poly(p-chlorostyrene) and poly(p-iodostyrene) were prepared as in Example 1 from the corresponding monomers and they were purified and pressed into films. The stabilities of their electrets, which are outside this invention, are shown in Table 8. This shows that higher Tg alone is not sufficient to permit the formation of a stable electret. Tg for poly(chlorostyrene) is 120° C and for poly(iodostyrene) is 156° C. The apparently polarizable character of iodine makes the substrate lose charge.

Table 8

Charge Decay Characteristics of Halogenated Polystyrene Electrets, Tested Under Room Temperature and 100% Relative Humidity.

| Time In Days | Poly(p-chlorostyrene) | | Poly(p-iodostyrene) | |
|---|---|---|---|---|
| | Bias Voltage | Relative Ratio | Bias Voltage | Relative Ratio |
| 0 | 1900 | 1.00 | 1450 | 1.00 |
| 7 | 1670 | 0.88 | 450 | 0.31 |
| 27 | — | — | 360 | 0.25 |
| 82 | 1300 | 0.69 | 230 | 0.16 |
| 250 | 1100 | 0.58 | — | — |

EXAMPLE 9

A copolymer of styrene and alpha-methylstyrene in a ratio of 2:3 was prepared by following the method of U.S. Pat. No. 2,556,459, Wesp, June 12, 1951, Example 1. It was purified through the use of benzene and pressed into films. The stabilities of the electrets (which are outside the invention) under various environmental conditions is shown in Table 9. The electret stability of this copolymer is the least of all. Since polymers of alpha-methylstyrene depolymerize when processed above 65° C (ceiling temperature), the films of this copolymer should contain considerable amounts of alpha-methylstyrene. This very clearly shows the effects of the presence of aromatic materials on the stabilities of electrets in the polystyrene series because Tg of this

EXAMPLE 10

In order to have a meaningful picture as to the stabilities of the various polystyrene electrets, samples of commercial poly(tetrafluoroethylene-co-hexafluoropropylene) (Teflon [trademark] FEP, Type A) of 20 mils thickness were charged as electrets and the stabilities of these (which are outside the invention) were tested. This is shown in Table 10. This shows that Teflon FEP is one of the best electret materials available.

The above tables of charge decay characteristics for various polystyrene electrets show that polystyrene electrets compare favorably with FEP electrets with the added advantages of lower cost, easier preparation and processing characteristics, and rigid dimensional structures.

Table 10

Charge Decay Characteristics of Teflon FEP Electrets

| Time In Days | Room Temperature/100% Relative Humidity | | 50° C/100% Relative Humidity | |
|---|---|---|---|---|
| | Bias Voltage | Relative Ratio | Bias Voltage | Relative Ratio |
| 0 | 1630 | 1.00 | 1550 | 1.00 |
| 1 | 1600 | 0.98 | 1530 | 0.99 |
| 15 | 1500 | 0.90 | 1470 | 0.95 |
| 29 | 1400 | 0.86 | 1420 | 0.91 |
| 43 | 1450 | 0.88 | 1430 | 0.92 |
| 111 | 1350 | 0.83 | 1430 | 0.92 |
| 174 | 1400 | 0.86 | 1390 | 0.90 |
| 230 | 1350 | 0.83 | 1350 | 0.87 |

I claim:

1. An electret made of electrostatically polarized, resinous, thermoplastic emulsion-polymerized styrene-type polymer selected from the group consisting of homopolymers of styrene, vinyltoluene or t-butylstyrene, and copolymers of at least two of said monomers, said polymer having a volume resistivity of at least $10^{16}$ ohm-cm, and a glass transition temperature above 50° C, and containing not more than 1% by weight of electron-donor impurities and not more than 0.5% by weight of electron-acceptor impurities, said electret being characterized by the ability to retain at least 75% of its original charge upon exposure to a temperature of 50° C at a relative humidity of 100% for 100 days.

2. An electret as in claim 1, in which the said polymer is polystyrene.

3. An electret as in claim 1 in which the said polymer is poly(vinyltoluene).

4. An electret as in claim 1 in which the said polymer is poly(t-butylstyrene).

5. An electret as in claim 1 in which the said polymer is a copolymer of styrene and vinyltoluene.

6. An electret as in claim 1 in which the said polymer is a copolymer of styrene and t-butylstyrene.

7. An electret as in claim 1 in which the said polymer is a copolymer of vinyltoluene and t-butylstyrene.

8. A charged electret consisting of an electrostatically polarized, resinous, thermoplastic emulsion-polymerized styrene-type polymer selected from the group consisting of
   (i) homopolymers of styrene, vinyltoluene or t-butylstyrene, and
   (ii) copolymers of at least two of the said monomers, said polymer having a volume resistivity of at least $10^{16}$ ohm-cm, and a glass transition temperature above 50° C., and containing not more than 1% by weight of electron-donor impurities and not more than 0.5% by weight of electron-acceptor impurities, said electret being characterized by the ability to retain at least 75% of its original charge upon exposure to a temperature of 50° C at a relative humidity of 100% for 100 days.

9. A method of making the electret of claim 8 comprising sandwiching the said styrene-type polymer between two glass plates and applying a DC voltage of about 20 to 60 KV for 1 to 5 minutes.

* * * * *